United States Patent [19]

DeAngelis et al.

[11] Patent Number: 4,681,624
[45] Date of Patent: Jul. 21, 1987

[54] METHOD OF FILTERING MOLTEN METALS USING A MONOLITHIC REFRACTORY HONEYCOMB FILTER

[75] Inventors: Thomas P. DeAngelis, Horseheads; John P. Day, Big Flats, both of N.Y.

[73] Assignee: Corning Glass Works, Corning, N.Y.

[21] Appl. No.: 727,529

[22] Filed: Apr. 26, 1985

[51] Int. Cl.⁴ .............................................. C22B 9/02
[52] U.S. Cl. ...................................... 75/28; 210/510.1; 210/767; 266/227
[58] Field of Search ................... 55/523; 501/106, 107; 210/510.1, 767; 75/20 R, 28, 68 R; 266/227

[56] References Cited

U.S. PATENT DOCUMENTS

| | | | |
|---|---|---|---|
| 1,694,924 | 12/1928 | Lowe | 106/57 |
| 1,774,607 | 9/1930 | Lubowsky | 106/57 |
| 2,338,209 | 1/1944 | Smith | 106/57 |
| 2,363,329 | 11/1944 | Horsfield | 106/57 |
| 2,553,265 | 5/1951 | Mochel | 106/57 |
| 2,684,912 | 7/1954 | Dreher | 106/57 |
| 3,090,094 | 5/1963 | Schwartzwalder et al. | 264/44 |
| 3,112,184 | 11/1963 | Hollenbach | 25/156 |
| 3,181,985 | 5/1965 | Thomas | 106/57 |
| 3,303,032 | 2/1967 | Holt et al. | 106/57 |
| 3,444,925 | 5/1969 | Johnson | 165/166 |
| 3,585,390 | 6/1971 | Ishikawa | 250/84 |
| 3,791,834 | 2/1974 | Manigault | 106/57 |
| 3,804,649 | 4/1974 | Manigault | 106/57 |
| 3,893,917 | 7/1975 | Pryor et al. | 210/510.1 |
| 4,165,235 | 8/1979 | Dantzig et al. | 266/227 X |
| 4,251,239 | 2/1981 | Clyde et al. | 55/131 |
| 4,364,760 | 12/1982 | Higuchi et al. | 210/510.1 X |
| 4,461,843 | 7/1984 | McGarry et al. | 501/102 |
| 4,494,985 | 1/1985 | Butler et al. | 75/61 |

FOREIGN PATENT DOCUMENTS 43694  1/1982  European Pat. Off. .

OTHER PUBLICATIONS

"The Unlimiters Celcor ® Ceramics", Product Bulletin, Corning Glass Works.
"Celcor ® Cellular Ceramics", Products Bulletin, Corning Glass Works.
"MetalFilters", Product Bulletin, Corning Glass Works.

Primary Examiner—Richard V. Fisher
Assistant Examiner—W. Gary Jones
Attorney, Agent, or Firm—R. N. Wardell; G. H. Levin

[57] ABSTRACT

A monolithic refractory honeycomb filter of zircon or zircon plus an oxide additive is useful to remove impurities from molten metal, particularly from molten steel. The filter has a frontal contact surface containing the openings of a plurality of through-and-through cells for passage of the molten metal. Impurities adhere to the frontal contact surface of the filter and to the cell walls themselves.

12 Claims, 1 Drawing Figure

METHOD OF FILTERING MOLTEN METALS USING A MONOLITHIC REFRACTORY HONEYCOMB FILTER

BACKGROUND OF THE INVENTION

In the processing of molten metals, it is desirable and often necessary to remove various solid impurities. In the production of steel, for example, molten steel is deoxidized, or "killed", by the addition of aluminum and silicon to scavenge dissolved oxygen, resulting in the formation of alumina and silica particles, known as inclusions, which must be removed from the molten batch. Filters of various kinds and compositions are used for this purpose. Open-celled ceramic structures in the form of replicas of organic sponges are described in U.S. Pat. No. 3,090,094 for use as molten-metal filters. Ceramic materials used in these filters are, for example, zirconia, zircon, petalite, mullite, talc, silica, and alumina. Foamed ceramic filters for molten metal processing are described, for example, in U.S. Pat. No. 3,893,917 to Pryor, et.al. Ceramic materials used in such filters are, for example, alumina, chromia, zirconia, magnesia, silica, and titania. The utility of such replica and foamed ceramic filters in molten metal service, however, is diminished by their fragility and inherent structure. Replica and foamed ceramics do not have sufficient strength for use in large filters, which limits the rate at which metal can be processed. Filters made of such replicas and foams have a random pore structure, which also does not permit desirable throughput rates of the molten metal.

Zircon-based refractory articles are known to have appreciable strength and corrosion resistance, and have been used in molten metal processing. For example, U.S. Pat. No. 3,303,032 issued to Holt, et.al. discloses refractory compositions of zircon and a basic oxide used as the lining of vessels, furnaces, or piping which come into contact with molten steel. U.S. Pat. Nos. 3,791,834 and 3,804,649, both issued to Manigault, disclose refractory compositions of zircon, titanium dioxide, and another oxide which can be used in contact with molten metal or glass. Molten-metal filters of monolithic honeycomb character, with multiple substantially parallel open channels, or longitudinally-extending cells therethrough, however, are not known to have been based on zircon.

It is therefore an object of this invention to provide a filter which has the strength and thermal shock resistance necessary for molten metal service and which has a configuration that allows sufficient flow of the molten metal therethrough.

SUMMARY OF THE INVENTION

A monolithic refractory honeycomb filter for molten metal is provided. The filter has a frontal contact surface which has about 50–400 open cells per square inch, said cells defining 60–75% of the frontal surface are and extending substantially longitudinally through the filter. The filter consists essentially of zircon or zircon substituted with up to 50% by weight of a metal oxide sintering aid selected from an oxide of magnesium, zinc, cerium, titanium, manganese, chromium, iron, copper, nickel, and mixtures of these. Filters of the present invention allow efficient metal processing, in terms of the impurities strained and the rate of flow of metal. The filters have excellent strength and thermal shock resistance.

A method of removing impurities from molten metals by passing the molten metal through such a filter is also provided. The method provides the efficient removal of impurities, allowing the molten metal stream to be filtered at commercially desirable rates.

DETAILED DESCRIPTION OF THE INVENTION

Figure 1:
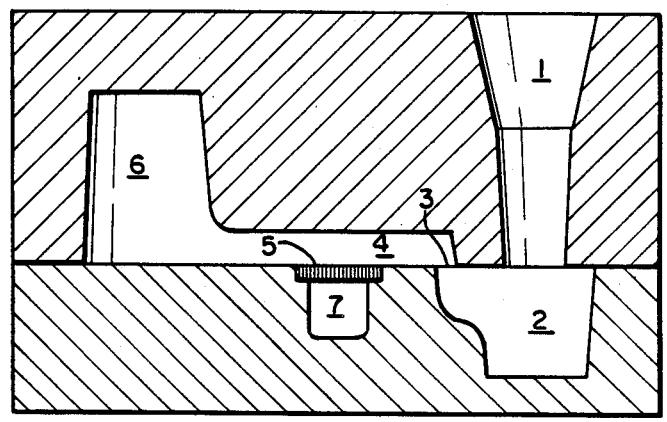
FIG. 1 is a cross-sectional view of a metal casting gating system from the inlet sprue to the filter.

According to the present invention, monolithic honeycomb filters of zircon, or zircon substituted with up to 50% by weight of a metal oxide sintering aid, are useful to remove impurities from molten metals. The filters are shaped to provide a frontal surface, for initial contact with the molten metal, and contain a plurality of open cells which extend substantially longitudinally and substantially mutually parallel from the frontal surface through the filter, thereby defining channels for the flow of metal. Filter shapes of the invention, to be described more fully herein, have the surface-to-volume ratio necessary for proper filtration of impurities in the metals, and the fluid-flow characteristics adequate to provide the desired throughput of the molten metal stream. Impurities larger than a cell opening are strained from the metal stream at the frontal surface, and smaller impurities adhere to the interior cell walls as the metal passes through.

As used herein, "honeycomb" is not used in the limited sense of bees' honeycomb, but is any structure which has substantially parallel open channels, or longitudinally-extending cells, therethrough defined by relatively thin separator walls and in which the transverse cross-sectional configuration of the channels or cells is of any rounded (i.e., circular or elliptical) or polygonal (i.e., triangular, rectangular, hexagonal) shape.

The zircon-based materials from which the filters are formed provide the physical properties desired for the molten metal service. The materials have high strength, good thermal shock resistance, and porosity to a degree which can aid in the filtering activity but does not adversely affect strength.

Specifically, the refractory material useful in this invention is zircon (zirconium silicate) or a mixture of 50–100% by weight zircon and 0–50% by weight of a sintering aid for the zircon. The sintering aid is a metal oxide selected from the group consisting of magnesium oxide, zinc oxide, cerium oxide, manganese oxide, titanium oxide, chrome oxide, iron oxide, copper oxide, nickel oxide, and mixtures of these. These sintering aids provide additional strength to the zircon material by binding action, which permits the zircon phase to densify at a firing temperature of about 1300°–1500° C., lower than that at which pure zircon would densify (about 1600°–1675° C.).

Amounts of sintering aid above 50% by weight can be used, but the beneficial effects imparted tend to be outweighed by the loss of thermal shock resistance that can occur when amounts substantially above this level are added to the zircon. Preferably, 1–25% by weight of sintering aid oxide, and more preferably 1–20% by weight, depending on the particular oxide, are added. For example, preferred levels of magnesium oxide are 1-10% by weight; of zinc oxide, 5-20% by weight; of cerium oxide, 10-20% by weight; of manganese oxide, about 2% by weight; and of titanium oxide, 1-5% by weight and more preferably 1-2% by weight. The most preferred oxides are those of magnesium, titanium, zinc and cerium. Magnesium and titanium are particularly preferred.

The various sintering aid oxides can be mixed with the zircon as such or can be mixed in a form which converts or decomposes to the actual oxide upon firing. For example, magnesium oxide can be provided to the refractory composition as a magnesium salt which decomposes to magnesium oxide upon firing.

In the filter structure itself, during firing, some phase change may occur between the various ingredients. For example, magnesium oxide may react with zircon to form minor amounts of forsterite ($Mg_2SiO_4$) and zirconia, but nevertheless leaving zircon itself as the major phase. It will be understood, therefore, that x-ray diffraction of the fired refractory material may indicate the presence of crystalline substances other than the zircon or sintering aid oxides herein described. Those skilled in the art will recognize that the existence and amount of such other crystalline substances will be consistent with the firing-induced reaction of zircon and a metal oxide, and the composition of the fired refractory is therefore expressed in terms of the corresponding "green" batch composition.

The monolithic refractory filters of this invention are prepared by mixing the zircon or zircon/oxide composition with a temporary binder. It is preferred to premix the zircon and metal oxide sintering aid by intensively dry mixing the materials. These refractory materials are preferably in the form of finely divided powders of a size finer than 100 mesh (U.S. Capital Standard), more preferably finer than 200 mesh, and most preferably finer than 325 mesh. Generally, 1-30 parts by weight of binder will be combined with 100 parts by weight of the refractory materials. Binder materials conventionally used in ceramic manufacture are suitable. Examples are disclosed in the following articles, incorporated herein by reference:

"Ceramics Processing Before Firing," ed. by George Y. Onoda, Jr. & L. L. Hench, John Wiley & Sons, New York "Study of Several Groups of Organic Binders Under Low-Pressure Extrusion," C. C. Treischel & E. W. Emrich, *Jour. Am. Cer. Soc.*, (29), pp. 129-132, 1946

"Organic (Temporary) Binders for Ceramic Systems," S. Levine, *Ceramic Age*, (75) No. 1, pp. 39+, January 1960

"Temporary Organic Binders for Ceramic Systems," S. Levine, *Ceramic Age*, (75) No. 2, pp. 25+, February 1960

Preferred are methyl cellulose or a mixture of methyl cellulose and a silicone resin. The silicone resins preferred for use are Dow Corning Corporation's Q6-2230 silicone resin or those described in U.S. Pat. No. 3,090,691 to Weyer. The most preferred binder is methyl cellulose, available as METHOCEL A4M from the Dow Chemical Company. Up to about 1 percent by weight, based upon total mixture weight, of a surfactant, such as sodium stearate, can also be used to facilitate mixing and flow for subsequent processing. The mixing step should be performed in a liquid, preferably distilled water, which acts as a further plasticizer. When the binder is a silicone resin, it is preferred to use isopropyl alcohol in addition to water. Normally, the dry ingredients are first pre-mixed and then combined with the liquid plasticizer. The filter structures are prepared by combining the components to form a homogeneous or substantially homogeneous mixture. Conventional mixing equipment can be used, but the use of a mix muller is preferred. Mixing is generally continued until a plasticized batch is obtained. Ultimately, the batch is formed into the desired filter shape, preferably by extrusion through a die or by injection molding.

Finally, the "green" shapes are heated to a temperature and for a time sufficient to sinter the zircon phase and to impart substantial strength to the material. Optionally, this heating/sintering step can be preceded by drying the shapes at about 100°-120° C. The heating/sintering step generally takes place at 1100°-1700° C., although when a sintering aid oxide is present, temperatures below about 1600° C. can be used. Preferably, temperatures of 1300°-1500° C. are used.

The filter shape has a substantially flat frontal surface and contains a plurality of open cells which extend from the frontal surface substantially longitudinally through the filter. Generally, the filter contains 50-400 cells per square inch of frontal surface area, preferably 200-400 cells per square inch. The cells are of such size that 60-75% of the frontal surface area is defined by the cell openings. Preferred filters have an open frontal area in the lower portion of this range (that is, 60-65%). Effectiveness of the filters is higher where an increased cell density (number of cells per unit of frontal surface area) is associated with decreased open frontal area. A most preferred filter shape of this kind is a honeycomb having about 300 open square cells per square inch, the cells defining substantially parallel through-and-through channels extending substantially longitudinally from the frontal contact surface, and a frontal surface area that is about 63% open cells. The honeycombs can be square or circular and have a thickness, defining the channel length, of about 0.25-1.0 inch (about 0.68-2.54 cm), preferablly about 0.5 inch (about 1.25 cm).

The refractory material of the filter shapes, after firing, preferably exhibits a low coefficient of thermal expansion, providing good thermal shock resistance. In molten metal service, the filters are exposed to abrupt temperature changes which arise as metal at a temperature of about 1600° C. comes into contact with the relatively cool filter. The thermal expansion coefficient (CTE), as measured over a range of about 25°-900° C., is generally below $55 \times 10^{-7}/°$ C. The refractory material should also exhibit high strength, indicated by a high modulus of rupture. Preferably the material has a modulus of rupture of at least 3,000 pounds per square inch (about 0.9 kilograms per square meter), more preferably at least 6,000 pounds per square inch (about 1.8 kilograms per square meter).

Although wall porosity is not necessary to the filters of this invention, filtering action is enhanced when moderate porosity is present. With the present filters, impurities in the molten metal are removed not only at the frontal contact surface of the filter, where larger impurities tend to be strained, but also in pores in the cell (or channel) walls, in which smaller impurities lodge and adhere as the molten metal flows through. Accordingly, it is preferred that the refractory material have a porosity up to about 20%, and more preferred that the material have a porosity of 20-35%. Porosity is preferably measured by mercury penetration, but measurement by water absorption can be made as well.

The filters of the present invention can be used in the processing of various molten metals and are particularly well suited for steel or super-alloy casting because of their ability to withstand the high temperatures involved in these casting processes. The filters can be used in connection with pour cup casting operations or operations that use a gating system. It has been found that the filters of the invention can be used without the necessity of preheating if the gating system in the casting operation is within a certain design. FIG. 1 depicts a simplified metal casting gating system from the sprue to the filter. With particular reference to FIG. 1, molten metal enters the gating system through sprue opening 1, filling sprue well 2 and being forced by liquid head through choke 3. Molten metal passes through choke 3, enters cope runner 4, and passes over filter 5. Reservoir 6 is available to receive overflow. Molten metal is forced through filter 5 when sufficient liquid head pressure is imposed from reservoir 6 or sprue opening 1. The metal passes through filter 5 into drag runner 7 and to the casting (not shown).

In general, if a filter used in steel casting is substantially lower in temperature than is the molten steel, the steel can begin to solidify or "freeze" during the filtration, before it reaches the mold or cast. A skin can form on the frontal surface, or solid plugs can form in the filter cells, either of which can block the desired flow through the filter. This can be avoided by either preheating the filter or delivering the molten metal to the filter at a rate which prevents the formation of skins or plugs or which remelts them if formed.

It has been found that this delivery rate depends upon the relative cross-sectional areas presented to the liquid flow by cope runner 4 and choke 3. In particular, when the ratio of cross-sectional areas of cope runner 4 to choke 3 is from 1.2:1 to 1.8:1, preferably about 1.4:1, the preferred rate is attained. It has been found that a gating system similar to that of FIG. 1 in which the ratio is 2.8:1 does not properly heat-prime the filters, and preheating would be required.

The following examples are illustrative, but not limiting, of the filters of this invention.

EXAMPLE 1

The compositions indicated in Table 1A were each prepared as follows: The indicated refractory components were mixed with 4% by weight, based on the refractory component weight, of methyl cellulose and 1% by weight, based on the refractory component weight of sodium stearate. The total mixture weight for each example was 2,500 grams. The dry components were rolled for two hours with mixing balls in NALGENE jars, and the resultant dry mixture was then charged to a mix muller in which it was combined with 18% by weight, based on the dry mixture weight, of distilled water. The resulting batch was mulled until substantial homogeneity and plasticity were attained. The mulled batch was extruded through a "noodling" die to effect further mixing and then extruded either through a 0.25 inch (0.635cm) diameter rod die or through a matrix die to form a honeycomb one inch (2.54 cm) in diameter having a cell density of 200 square cells per square inch. The extruded pieces were dried in an oven at 100° C. and then fired for six hours at various temperatures between 1300° C. and 1700° C. Properties of the refractory materials of the filter and rods are listed in Table 1B.

TABLE 1A

| Example | Wt % Zircon | Wt % Sintering Aid | Sintering Aid |
|---|---|---|---|
| 1A | 100 | — | — |
| 1B | 95 | 5 | $Cr_2O_3$ |
| 1C | 80 | 20 | $Cr_2O_3$ |
| 1D | 99 | 1 | $TiO_2$ |
| 1E | 98 | 2 | $TiO_2$ |
| 1F | 95 | 5 | $TiO_2$ |
| 1G | 85 | 15 | $TiO_2$ |
| 1H | 98 | 2 | $Mn_2O_3$ |
| 1I | 98 | 2 | $MnO_2$ |

TABLE 1B

| Example | Firing Temp (°C.) | Linear Shrinkage (%) | CTE 25° C.–900° C. ($10^{-7}$/°C.) | Modulus of Rupture (psi) | Percent Porosity (Hg) Rod | Percent Porosity (Hg) Honeycomb |
|---|---|---|---|---|---|---|
| 1A | 1400 | 5.81 | 49.1 | 11923 | 39.4 | 34.4 |
|  | 1700 | 8.74 | 47.2 | 19325 | 17.6 | — |
|  | 1550 | 7.58 | — | 16403 | 26.5 | — |
| 1B | 1400 | 7.20 | 48.8 | 16955 | 27.9 | 29.4 |
|  | 1700 | 12.14 | 62.3 | 12106 | 18.6 | — |
|  | 1550 | 11.97 | 48.4 | 16398 | 16.3 | — |
| 1C | 1400 | 6.77 | 52.4 | 13763 | 31.5 | 29.5 |
|  | 1700 | 13.26 | 58.2 | 11922 | 27.0 | — |
|  | 1550 | 12.38 | 50.1 | 15245 | 9.7 | — |
| 1D | 1400 | 8.60 | 48.0 | 19089 | 25.0 | 25.9 |
|  | 1700 | 12.49 | 46.2 | 22233 | 5.6 | — |
|  | 1550 | 13.66 | 47.9 | 24153 | 1.1 | — |
| 1E | 1400 | 8.56 | 47.7 | 17928 | 24.6 | 24.6 |
|  | 1700 | 11.64 | 44.6 | 24238 | 10.5 | — |
|  | 1550 | 13.21 | 48.8 | 25244 | 7.1 | — |
| 1F | 1300 | 5.75 | 48.2 | 13817 | 29.8 | — |
|  | 1400 | 6.93 | 50.0 | 16161 | 26.1 | — |
|  | 1500 | 9.94 | 50.2 | 19693 | 18.8 | — |
| 1G | 1300 | 6.44 | 55.3 | 12145 | 30.2 | — |
|  | 1400 | 7.74 | 55.8 | 14145 | 26.2 | — |
|  | 1500 | 10.85 | 54.2 | 17570 | 14.4 | — |
| 1H | 1300 | 11.94 | 47.0 | 20547 | 18.5 | — |
|  | 1400 | 12.55 | 49.3 | 20074 | 16.0 | — |
|  | 1500 | 13.38 | 50.4 | 18185 | 13.7 | 15.2 |
| 1I | 1300 | 11.72 | 50.2 | 17160 | 19.7 | — |
|  | 1400 | 12.37 | 55.3 | 18240 | 18.4 | — |

TABLE 1B-continued

| Example | Firing Temp (°C.) | Linear Shrinkage (%) | CTE 25° C.–900° C. ($10^{-7}$/°C.) | Modulus of Rupture (psi) | Percent Porosity (Hg) Rod | Percent Porosity (Hg) Honeycomb |
|---|---|---|---|---|---|---|
| | 1500 | 13.44 | 50.5 | 17780 | 15.1 | 15.2 |

EXAMPLE 2

The compositions indicated in Table 2A were each prepared as follows: The indicated refractory components were wet milled for two hours with 4% by weight, based on the refractory component weight, of carbowax; 1,1,1-trichloroethane was used as a plasticizer. The batches were wet milled in a NALGENE jar with mixing balls. The mixed batches were dried, granulated and sieved through a 20-mesh screen, and then pressed into bars (1.3 cm×1.3cm×7.6cm) at 5000 psi in order to test the properties of the material. The bars were fired for 6 hours at a temperature of 1300° C., 1500° C., or 1650° C. Properties of the refractory materials of the bars are listed on Table 2B. These refractory materials can be fabricated into monolithic honeycomb filters.

TABLE 2A

| Example | Wt % Zircon | Wt % Sintering Aid | Sintering Aid |
|---|---|---|---|
| 2A | 98 | 2 | $Fe_2O_3$ |
| 2B | 90 | 10 | $Fe_2O_3$ |
| 2C | 80 | 20 | $Fe_2O_3$ |
| 2D | 98 | 2 | $Mn_2O_3$ |
| 2E | 95 | 5 | $Mn_2O_3$ |
| 2F | 90 | 10 | $Mn_2O_3$ |
| 2G | 95 | 5 | $TiO_2$ |
| 2H | 85 | 15 | $TiO_2$ |
| 2I | 70 | 30 | $TiO_2$ |
| 2J | 98 | 2 | CuO |
| 2K | 95 | 5 | CuO |
| 2L | 90 | 10 | CuO |
| 2M | 95 | 5 | NiO |
| 2N | 85 | 15 | NiO |
| 2O | 70 | 30 | NiO |

TABLE 2B

| Example | Firing Temp. (°C.) | Linear Shrinkage (%) | Percent Porosity (Hg) | Modulus of Rupture (psi) | CTE 25°–900° C. ($10^{-7}$/°C.) |
|---|---|---|---|---|---|
| 2A | 1300 | 4.52 | 33.3 | 5994 | 46.6 |
| | 1500 | 14.65 | 0.0 | 25362 | 46.7 |
| | 1650 | 14.10 | .2 | 23253 | 47.9 |
| 2B | 1300 | 5.88 | 42.3 | 6219 | 49.5 |
| | 1500 | 12.12 | 10.6 | 15438 | 50.7 |
| | 1650 | 10.34 | 25.6 | 8023 | 47.5 |
| 2C | 1300 | 7.66 | 28.0 | 8666 | 44.4 |
| | 1500 | 10.29 | 16.5 | 9778 | 32.2 |
| | 1650 | 11.68 | 26.6 | — | — |
| 2D | 1300 | 10.45 | 24.1 | 15667 | 47.5 |
| | 1500 | 13.29 | 17.8 | 20426 | 47.9 |
| | 1650 | 14.24 | 11.8 | 15246 | 46.7 |
| 2E | 1300 | 14.49 | 13.0 | 16291 | 47.2 |
| | 1500 | 15.71 | 0.0 | 26647 | 48.1 |
| | 1650 | 15.93 | 2.1 | 18321 | 50.6 |
| 2F | 1300 | 15.47 | 6.4 | 16558 | 64.4 |
| | 1500 | 13.98 | 2.4 | 14137 | 51.2 |
| | 1650 | 14.11 | 14.6 | 6565 | 58.8 |
| 2G | 1300 | 3.63 | 35.3 | 5000 | — |
| | 1500 | 12.12 | 15.3 | 15751 | 46.5 |
| | 1650 | 12.17 | .4 | 21106 | — |
| 2H | 1300 | 4.83 | 40.2 | 6321 | 55.6 |
| | 1500 | 14.98 | 7.5 | 17435 | 49.2 |
| | 1650 | 11.85 | 12.9 | 7567 | — |
| 2I | 1300 | 5.38 | 34.0 | 11158 | 59.5 |
| | 1500 | 15.10 | 0.0 | 27892 | 70.2 |
| | 1650 | 12.28 | 7.9 | 8077 | 52.6 |
| 2J | 1300 | 8.41 | 30.1 | 14051 | 47.9 |
| | 1500 | 10.16 | 11.6 | 15539 | 46.3 |
| | 1650 | 7.22 | 34.5 | 10800 | 45.8 |
| 2K | 1300 | 7.37 | 30.9 | 12270 | 54.7 |
| | 1500 | 11.32 | 22.1 | 15977 | 46.6 |
| | 1650 | 7.96 | 30.3 | 9747 | 43.7 |
| 2L | 1300 | 6.95 | 25.9 | 12168 | 44.8 |
| | 1500 | 12.43 | 14.4 | 17528 | 47.6 |
| | 1650 | — | — | — | — |
| 2M | 1300 | 4.90 | 31.4 | 6822 | 43.8 |
| | 1500 | 13.06 | 13.6 | 17295 | 44.0 |
| | 1650 | 14.22 | .8 | 5365 | 47.0 |
| 2N | 1300 | 5.79 | 38.5 | 5214 | 48.0 |
| | 1500 | 14.72 | 14.6 | 15683 | 46.2 |
| | 1650 | 12.68 | 20.8 | 5525 | 45.4 |
| 2O | 1300 | 6.66 | 37.5 | 5011 | 49.2 |
| | 1500 | 15.40 | 10.4 | 13077 | 44.4 |
| | 1650 | — | — | — | — |

EXAMPLE 3

The compositions indicated in Table 3 were each prepared by mixing the indicated refractory materials (zircon plus sintering aid oxide) with 4% by weight, based on refractory weight, of carbowax which was pre-dissolved in 1,1,1-trichloroethane. Mixing was effected by rolling overnight in plastic jars containing mixing balls. The mixed batches were dried, granulated and sieved through a 20-mesh screen, and pressed into bars (1 cm×1 cm×7.6cm) at 10,000 psi in order to test the properties of the material. The bars were fired for 6 hours at the temperatures indicated on the table. Properties of the refractory materials of the bars are listed in the table. These materials can also be formed into honeycomb filters as described herein.

TABLE 3

| Composition (Weight %) | Firing Temp (°C.) | Linear Shrinkage (%) | Percent Porosity ($H_2O$) | CTE 25–900° C. ($10^{-7}$/°C.) | Modulus of Rupture (psi) |
|---|---|---|---|---|---|
| Zircon 75 | 1370 | 7.8 | 7.1 | 49.5 | — |
| ZnO 25 | 1530 | 10.5 | 7.6 | 53.1 | — |
| | 1650 | 7.2 | 7.6 | 50.9 | — |
| Zircon 90 | 1370 | 9.2 | 10.6 | 53.5 | 5892 |
| ZnO 10 | 1530 | 11.1 | 3.4 | — | — |
| | 1650 | 9.2 | 9.9 | 47.2 | 3358 |
| Zircon 95 | 1370 | 11.1 | 12.2 | 47.3 | 6924 |
| ZnO 5 | 1530 | 13.1 | 4.4 | 48.0 | — |
| | 1650 | 11.4 | 7.3 | 45.3 | 11431 |
| Zircon 99 | 1370 | 7.8 | 25.0 | 46.5 | — |
| ZnO 1 | 1530 | 8.5 | 23.0 | 47.3 | — |
| | 1650 | 7.2 | 24.0 | 43.9 | — |
| Zircon 75 | 1370 | 4.6 | 26.0 | 91.0 | 6689 |
| MgO 25 | 1530 | 10.5 | 10.1 | 98.9 | 2289 |
| | 1650 | 13.1 | 6.9 | — | — |
| Zircon 90 | 1370 | 6.5 | 26.0 | 71.8 | — |
| MgO 10 | 1530 | 12.4 | 9.5 | 62.9 | — |
| | 1650 | 13.7 | 15.0 | 64.9 | — |
| Zircon 95 | 1370 | 7.2 | 23.0 | 55.8 | — |

TABLE 3-continued

| Composition (Weight %) | Firing Temp (°C.) | Linear Shrinkage (%) | Percent Porosity (H$_2$O) (%) | CTE 25-900° C. (10$^{-7}$/°C.) | Modulus of Rupture (psi) |
|---|---|---|---|---|---|
| MgO 5 | 1530 | 11.8 | 7.5 | 48.0 | 9850 |
|  | 1650 | 10.2 | 10.4 | 53.6 | — |
| Zircon 99 | 1370 | 7.2 | 23.0 | 47.6 | — |
| MgO 1 | 1530 | 9.2 | 18.0 | 45.5 | — |
|  | 1650 | 9.2 | 15.0 | 46.5 | 11140 |
| Zircon 75 | 1370 | 8.5 | 19.0 | 54.3 | — |
| CeO$_2$ 25 | 1530 | 11.4 | 4.7 | 46.6 | — |
|  | 1650 | 11.8 | 9.1 | — | — |
| Zircon 90 | 1370 | 4.6 | 26.0 | 51.1 | — |
| CeO$_2$ 10 | 1530 | 8.5 | 13.0 | 48.1 | 11890 |
|  | 1650 | 10.5 | 5.6 | 47.7 | — |
| Zircon 95 | 1370 | 3.9 | 28.0 | 48.5 | — |
| CeO$_2$ 5 | 1530 | 5.9 | 23.0 | 47.1 | — |
|  | 1650 | 6.9 | 20.0 | 48.5 | — |
| Zircon 99 | 1370 | 3.9 | 29.0 | 46.1 | — |
| CeO$_2$ 1 | 1530 | 5.2 | 26.0 | 44.3 | — |
|  | 1650 | 5.8 | 18.0 | 45.9 | — |

EXAMPLE 4

Monolithic honeycomb zircon ceramic filters were applied in an overflow position in a gating system as shown in FIG. 1. The weight of metal after the filter was 175 lbs. Molds were made from CO$_2$ - silicate bonded sand.

Steel was melted and treated in an acid lined electric arc furnace. The melt was deoxidized using one lb. of aluminum and one lb. of a commercial silicon deoxidizer for every 1000 lbs. of metal. Each mold was filled from a 7 ton, alumina lined, bottom pour ladle. Temperatures were taken from the ladle before the first mold was poured and after the last pouring. Five series of molds were poured using this gating system. As a control, one pour was made without a filter.

The geometry and application characteristics of each of the filters tested are listed in Table 4. The data are presented in groups corresponding to the individual heats from which the molds were poured. All molds filled completely, even when poured at temperatures as low as 1562° C., indicating no "freezing" of the metal.

A comparison of the data in Table 4 indicates that filters with cell densities of 50, 100, and 200 cells/in$^2$ (having open frontal surface areas of 67%, 69%, and 69%, respectively) were able to pass the same amount of metal in about the same time. Also, metal pour times with and without a filter were comparable. Some filter breakage was noted in filter parts that were less than 1.251 cm thick. Above this thickness, no breakage was noted.

Visual and micrographic observation of the 100 cell/in$^2$ zircon filter used in one of the tests showed that large particulate impurities were stuck to the face of the filter and bridged across cell walls, that fine particles were attached to the cell wall, and that removed from the cell walls these fine particles had agglomerated into clouds. X-ray energy dispersion analysis showed these particulate impurities to contain predominantly aluminum cations with traces of calcium cations. These particulate impurities were, most likely, oxides formed during the deoxidation process.

TABLE 4

| Pour Test | Cell Density (Cells/in.$^2$) | Pour Temp. (°C.) | Pour Time (Secs.) | Filter Thickness (cm.) | Filter Breakage (%) |
|---|---|---|---|---|---|
| 1 | 50 | 1607 | 17.5 | 0.95 | 20 |

TABLE 4-continued

| Pour Test | Cell Density (Cells/in.$^2$) | Pour Temp. (°C.) | Pour Time (Secs.) | Filter Thickness (cm.) | Filter Breakage (%) |
|---|---|---|---|---|---|
|  | 50 | 1607 | 20.2 | 0.64 | 30 |
| 2 | 50 | 1604 | 16.5 | 1.25 | 0 |
|  | 50 | 1566 | 21.0 | 1.25 | 0 |
| 3 | 100 | 1604 | 15.3 | 1.25 | 0 |
| 4 | 50 | 1618 | 16.2 | 1.25 | 0 |
|  | 50 | 1621 | 14.2 | 1.25 | 0 |
|  | 100 | 1619 | 16.0 | 1.25 | 0 |
|  | 100 | 1616 | 13.6 | 1.25 | 0 |
| 5 | 200 | 1589 | 20.3 | 1.25 | 0 |
|  | 200 | 1589 | 17.1 | 1.25 | 0 |
| 6* | — | 1602 | 20.7 | — | — |

*(Control: no filter)

EXAMPLE 5

This example demonstrates a direct pouring test through a zircon honeycomb filter using a pouring cup assembly. Filters were loosely fitted into a pouring cup assembly and located over the downsprue of a green sand mold. The poured weight of the mold was 166 lb.

Steel was melted in an electric arc acid furnace and deoxidized using about 1.5 lbs. of a commercial silicon deoxidizer for every 1000 lbs. of metal. The steel was poured directly on the filters from a 375 lb. alumina lined teapot shank ladle. Two molds were poured from every ladle and the temperature of each pouring ladle recorded.

The pouring variables and results of this test for zircon molten metal filters are outlined in Table 5. None of the filters broke during the test, indicating that the filters possess thermal shock characteristics sufficient to withstand the direct impingement of molten steel at pouring temperatures approaching 1642° C. Filters with cell densities greater than 100 cells/in$^2$ briefly restricted the initial flow of metal, but once started, the flow continued unrestricted. Detailed analysis of the filtered impurities was not conducted, but visual observation of the filters indicated that the filtration of impurities was similar to that described in Example 4.

TABLE 5

| Cell Density (Cells/in.$^2$) | Open Frontal Area % | Pour Temp. (°C.) | Pour Time (Secs.) |
|---|---|---|---|
| 50 | 67 | 1614 | 9.6 |
| 100 | 69 | 1638 | 10.2 |
| 200 | 69 | 1642 | 10.5 |

We claim:

1. In a method of removing impurities from molten metal by passing the molten metal through a filter, the improvement comprising providing as the filter a monolithic refractory honeycomb filter consisting essentially of 50-100% by weight of zircon and 0-50% by weight of an oxide selected from the group consisting of magnesium oxide, zinc oxide, cerium oxide, chromium oxide, manganese oxide, titanium oxide, iron oxide, copper oxide, nickel oxide, and mixtures of these; said filter having a frontal contact surface containing 50-400 open cells per square inch; said open cells defining 60-75% of the frontal surface area and extending substantially longitudinally from the frontal surface through the filter so as to be open at both ends for passage therethrough of the molten metals.

2. A method of claim 1 wherein the cells of the frontal surface of said provided filter define 60–65% of the frontal surface area.

3. A method of claim 2 wherein the frontal surface has a cell density of about 300 cells per square inch.

4. A method of claim 1 in which the provided filter consists essentially 50–100% by weight of zircon and 0–50% by weight of magnesium oxide, zinc oxide, cerium oxide, titanium oxide, or manganese oxide.

5. A method of claim 1 in which the provided filter consists essentially of about 90–99% by weight of zircon at about 1–10% by weight of magnesium oxide.

6. A method of claim 1 in which the provided filter consists essentially of about 80–95% by weight of zircon and about 5–20% by weight of zinc oxide.

7. A method of claim 1 in which the provided filter consists essentially of about 80–90% by weight of zircon and about 10–20% by weight of cerium oxide.

8. A method of claim 1 in which the provided filter consists essentially of about 85–99% by weight of zircon and about 1–15% by weight of titanium oxide.

9. A method of claim 1 in which the provided filter consists essentially of about 95–99% by weight of zircon and about 1–5% by weight of titanium oxide.

10. A method of claim 1 in which the provided filter consists essentially of about 95–99% by weight of zircon and about 1–5% by weight of manganese oxide.

11. A method of claim 1 in which the molten metal is steel.

12. A method of claim 1 in which the filter is contained within a gating system, said gating system comprising a choke and a cope runner through which the molten metal passes to the filter, the ratio of the cross-sectional area of the cope runner to the cross-sectional area of the choke being about 1.2:1 to about 1.8:1.

* * * * *